(12) United States Patent
Lee

(10) Patent No.: US 7,041,215 B2
(45) Date of Patent: May 9, 2006

(54) SYSTEM FOR COMPOSTING-FREE DISPOSAL OF ORGANIC WASTES

(75) Inventor: Shing Hong Lee, Taipei (TW)

(73) Assignee: Yes-Sun Holdings Limited, Central (HK)

( * ) Notice: Subject to any disclaimer, the term of this patent is extended or adjusted under 35 U.S.C. 154(b) by 97 days.

(21) Appl. No.: 10/759,947

(22) Filed: Jan. 15, 2004

(65) Prior Publication Data

US 2005/0155931 A1 Jul. 21, 2005

(51) Int. Cl.
C02F 1/00 (2006.01)
C02F 1/02 (2006.01)
B01D 35/18 (2006.01)

(52) U.S. Cl. ............... 210/181; 210/182; 210/187; 210/632

(58) Field of Classification Search ........... 210/632, 210/175–187
See application file for complete search history.

(56) References Cited

U.S. PATENT DOCUMENTS

| | | | | |
|---|---|---|---|---|
| 4,193,854 A | * | 3/1980 | Drnevich et al. ........... 210/622 |
| 4,240,905 A | * | 12/1980 | Scaccia ...................... 210/629 |
| 4,913,095 A | * | 4/1990 | Morrow et al. ............. 119/450 |
| 5,062,387 A | * | 11/1991 | Anderson ................... 119/450 |
| 6,692,642 B1 | * | 2/2004 | Josse et al. ................. 210/605 |
| 2005/0035059 A1 | * | 2/2005 | Zhang et al. ............... 210/605 |
| 2005/0145566 A1 | * | 7/2005 | Haase et al. ................ 210/620 |

* cited by examiner

*Primary Examiner*—Chester T. Barry
(74) *Attorney, Agent, or Firm*—Rosenberg, Klein & Lee (57) ABSTRACT

A system for composting-free disposal of organic waste and method thereof included a heating apparatus, a pretreatment apparatus, and a decomposition apparatus. The heating apparatus heats the pretreatment apparatus and the decomposition apparatus. The organic waste is separated into a slurry and a surface oil-water mixed liquid by the pretreatment apparatus. Microbial enzymes and raw material are added into the slurry to become a mixture. The mixture is then decomposed and sterilized by the decomposition apparatus to become a composting-free organic fertilizer product. All these procedures can be carried out within 3 to 24 hours. The system and the method thereof provides an efficiently fast, space-saving way to deal with organic waste and achieve environmental protection and sanitation.

7 Claims, 9 Drawing Sheets

SYSTEM FOR COMPOSTING-FREE DISPOSAL OF ORGANIC WASTES

BACKGROUND OF THE INVENTION

1. Field of the Invention

The present invention relates to a system for composting-free disposal of organic wastes and a method thereof, and more particularly, to a system and technology that recycles organic wastes into a composting-free organic fertilizer product with high efficiency, less processing space, environmentally safe, and improved hygiene, without generating odors or propagating diseases.

2. Background of the Invention

Environmental protection is a focal point for every country of the world especially in dealing with various types of organic wastes generated from different activities, such as industrial (e.g. from food processing manufacturers, restaurants, or leather manufacturers), agriculture organic wastes (e.g. from gardens, farms, or cattle farms), and domestic (e.g. household waste). Thoughtful and fast disposal of organic wastes is a necessity for an area with a high population density, as the natural resources arc limited.

Conventional methods for disposing of organic waste, such as landfill, incineration, or compost, are associated with various problems, e.g. processing space, building and operating cost, time consumption, or air and water pollution.

Of all the organic wastes, the percentage of household waste is the highest. Because household waste contains a lot of waste water with oil content, when mixed with solid wastes, it generates odors and water content that make the garbage difficult to recycle. Meanwhile, the waste water contains organic matters that propagate bacteria and diseases. If the water content is directly drained without any pretreatment, it pollutes rivers, waterways and ground water. It is well known that household waste is an excellent organic fertilizer source, and hence can he efficiently reused as it can extend the lifetime of a landfill area or an incinerator, save money, and reduce social disputes caused by garbage problems. Use of swill to feed livestock with organic waste causes sanitation problems. High-speed fermentation involves a high energy consumption and degree of rottenness. Therefore, developed countries try to carry out highly efficient composting techniques to recycle the organic waste into organic fertilizer. Although chemical fertilizer is more efficient than organic fertilizer and greatly increases crop yield, but it also reduces the functionality of soil and destroys the ecological balance. As environmental consciousness has given rise to greater environmental protection, the organic manure and organic farming are becoming more popular.

Figure 1:
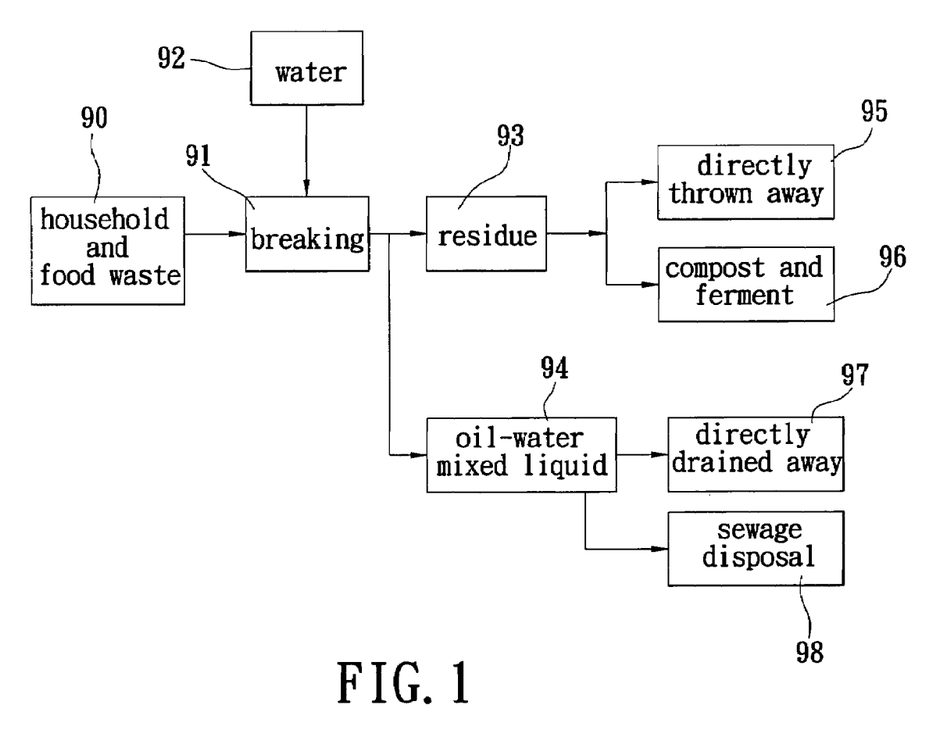
FIG. 1 is a schematic flowchart of a method for disposing of a household waste according to the prior art.

FIG. 1 illustrates a method for disposing of household waste. As illustrated, a household and food waste 90 is guided into a breaking apparatus to be broken into pieces 91, and water 92 is added to separate them into a residue 93 and an oil and water mixed liquid 94. The residue 93 is directly thrown away as 95 or sent to compost and ferment as 96, and the oil and water mixed liquid 94 is directly drained as 97 or directed to sewage disposal as 98.

According to the aforesaid method, a volume of the household waste can be reduced to ⅙ to ⅓ volume. However, a landfill area is needed for the residue. A high speed fermentation apparatus requires 48 to 72 hours to dry the residue and more than 15 days to reach a half-rotten form for organic matter. Subsequently when fertilizing, the residue generates a lot of toxins (e.g. methane, ammonia, and carbon monoxide) that pollute the environment. Also, chemical matters produced from the residue erode the high speed fermentation apparatus and thereby shortening its lifetime, increasing operating costs. The oil and water mixed liquid contains a lot of organic matter that propagate bacteria and diseases. If the oil and water mixed liquid is directly drained without any pretreatment, it pollutes the land and water systems.

Accordingly, as discussed above, the conventional method of disposing organic wastes still has some drawbacks that could be improved. The present technology/invention aims to resolve the drawbacks in the prior art.

SUMMARY OF INVENTION

The primary objective of the invention is therefore to specify a system for composting-free disposal of organic wastes and a method for the same, which recycles organic waste into a composting-free organic fertilizer product with high efficiency, less processing space, greater environmental protection, and improved sanitation, without generating odors or propagating diseases.

According to the invention, the objective is achieved by a system for composting-free disposal of organic waste, comprising a heating apparatus, a pretreatment apparatus and a decomposition apparatus. The organic waste is guided into the pretreatment apparatus to become a slurry. The decomposition apparatus is placed downstream of the pretreatment apparatus. Microbial enzymes and raw materials are added into the slurry to make a mixture. The heating apparatus heats this mixture, and the decomposition apparatus decomposes and sterilizes the mixture into a composting-free organic fertilizer product.

The objective is achieved by a method for composting-free disposal of organic waste, comprising following steps: (a) shattering the organic waste into a slurry; (b) adding microbial enzymes and raw material into the slurry to make a mixture; and (c) decomposing and sterilizing the mixture into a composting-free organic fertilizer product.

To provide a clear understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE EMBODIMENTS

Figure 2:
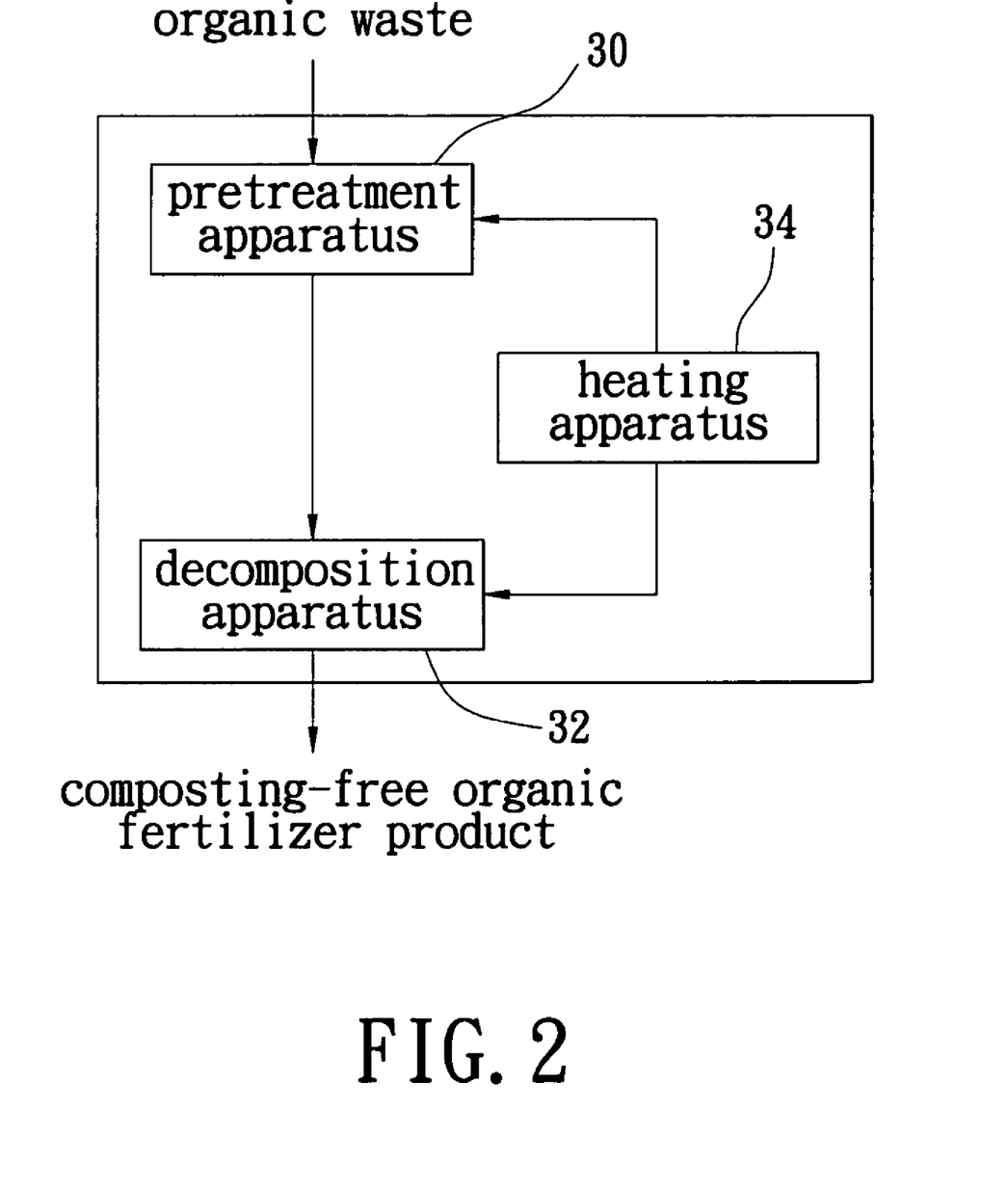
FIG. 2 is a schematic diagram of a system for composting-free disposal of organic waste according to the present invention.
Figure 3:
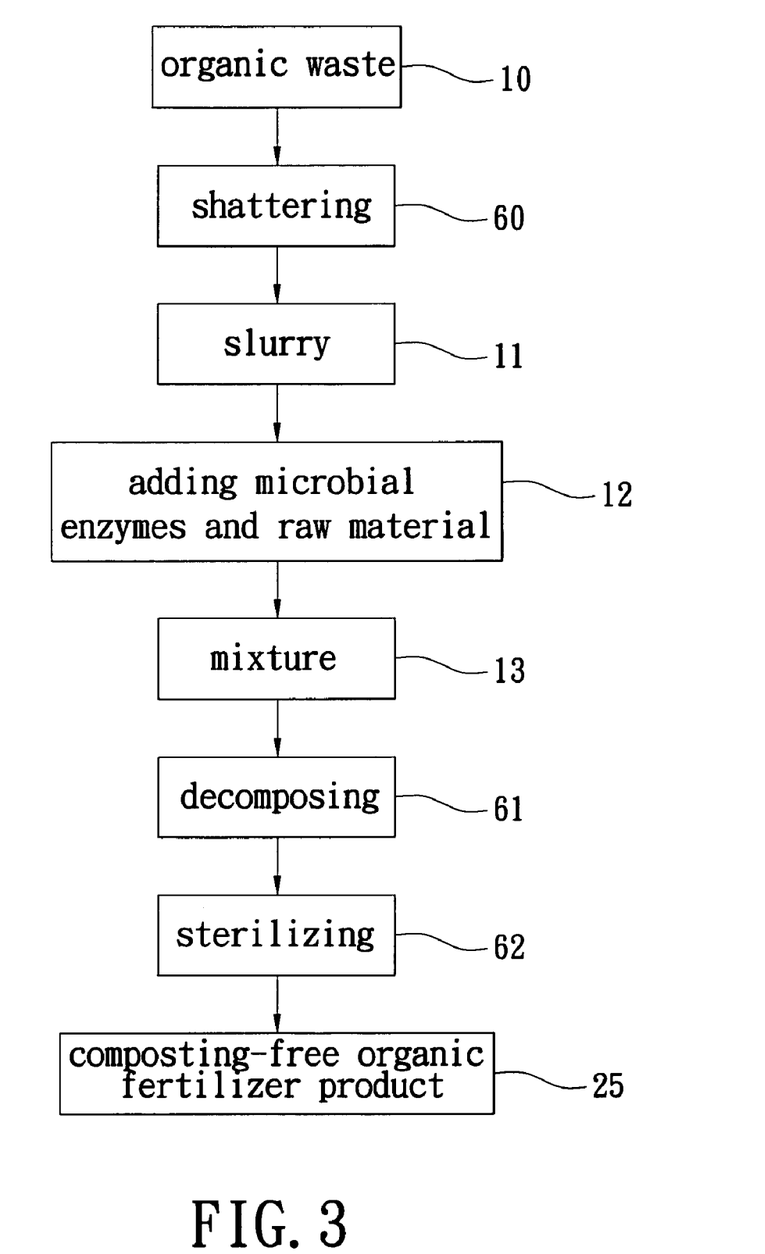
FIG. 3 is a schematic flowchart of a method for composting-free disposal of organic waste according to the present invention.

With respect to FIG. 2 and FIG. 3, the present invention provides a system for composting-free disposal of organic waste 10 and method for the same. The system comprises of a heating apparatus 34, a pretreatment apparatus 30, and a decomposition apparatus 32.

The heating apparatus 34 is a circulatory airtight heating system with kerosene therein or a circulatory airtight heating system with vapor therein. The kerosene or the vapor is heated by using a boiler or electric power.

The organic waste 10 is guided into the pretreatment apparatus 30 to become a slurry 11.

The decomposition apparatus 32 is located downstream from the pretreatment apparatus 30. Microbial enzymes and raw material are added into the slurry 11 to make a mixture 13. The heating apparatus 34 heats the mixture 13. The decomposition apparatus 32 decomposes and sterilizes the mixture 13 to make a composting-free organic fertilizer product 25.

The system further includes an electrical circuit control unit (not shown). The heating apparatus 34, the pretreatment apparatus 30, and the decomposition apparatus 32 are electrically connected to the electrical circuit control unit, which is set up to control working requirements, such as temperature, time or velocity.

The method comprises:

(a) shattering 60 of the organic waste 10 to make a slurry 11;

(b) addition of microbial enzymes and raw material 12 into the slurry 11 to make a mixture 13; and (c) decomposing 61 and sterilizing 62 of the mixture 13 to make a composting-free organic fertilizer product 25.

Figure 4:
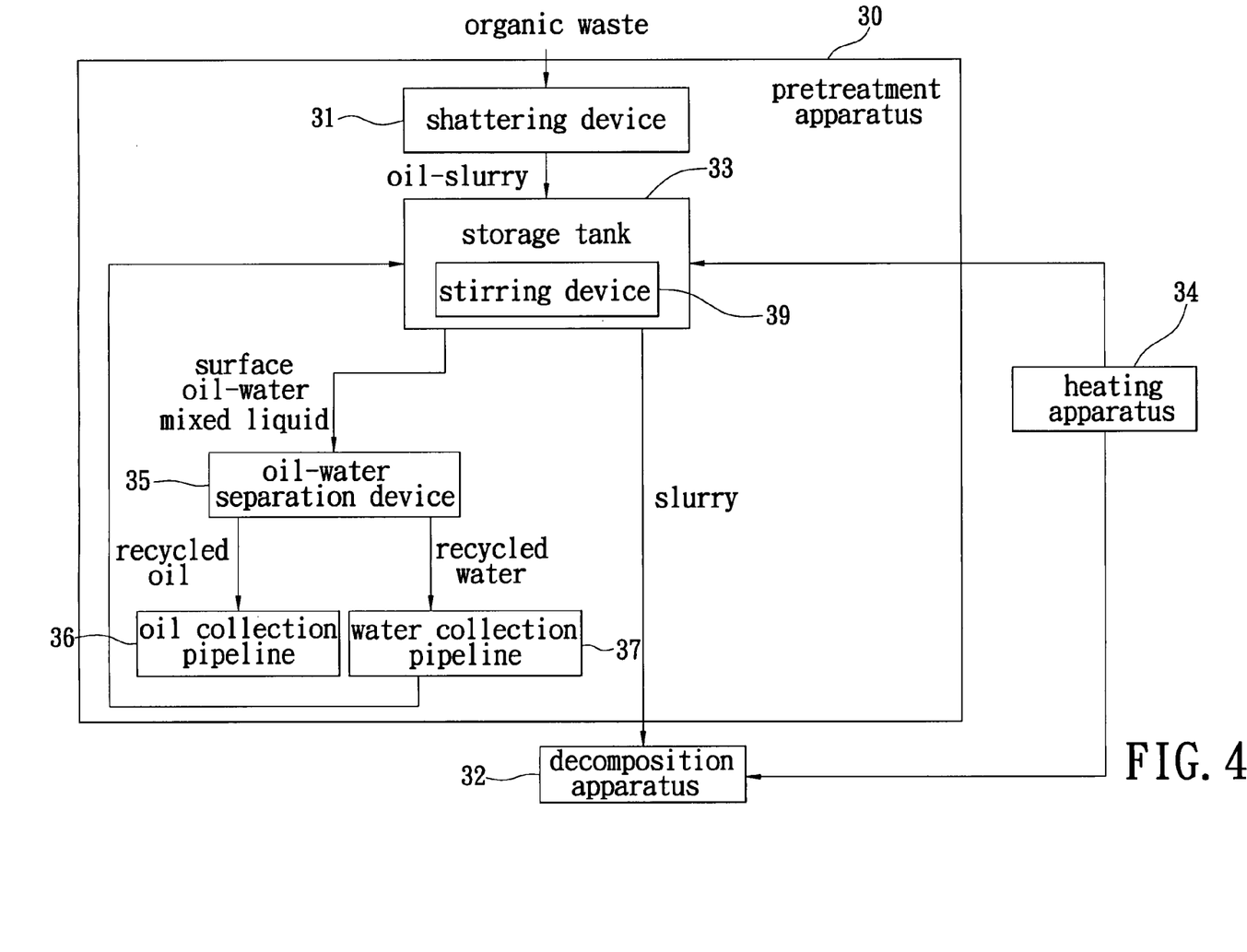
FIG. 4 is a schematic diagram of a pretreatment apparatus according to the present invention.
Figure 5:
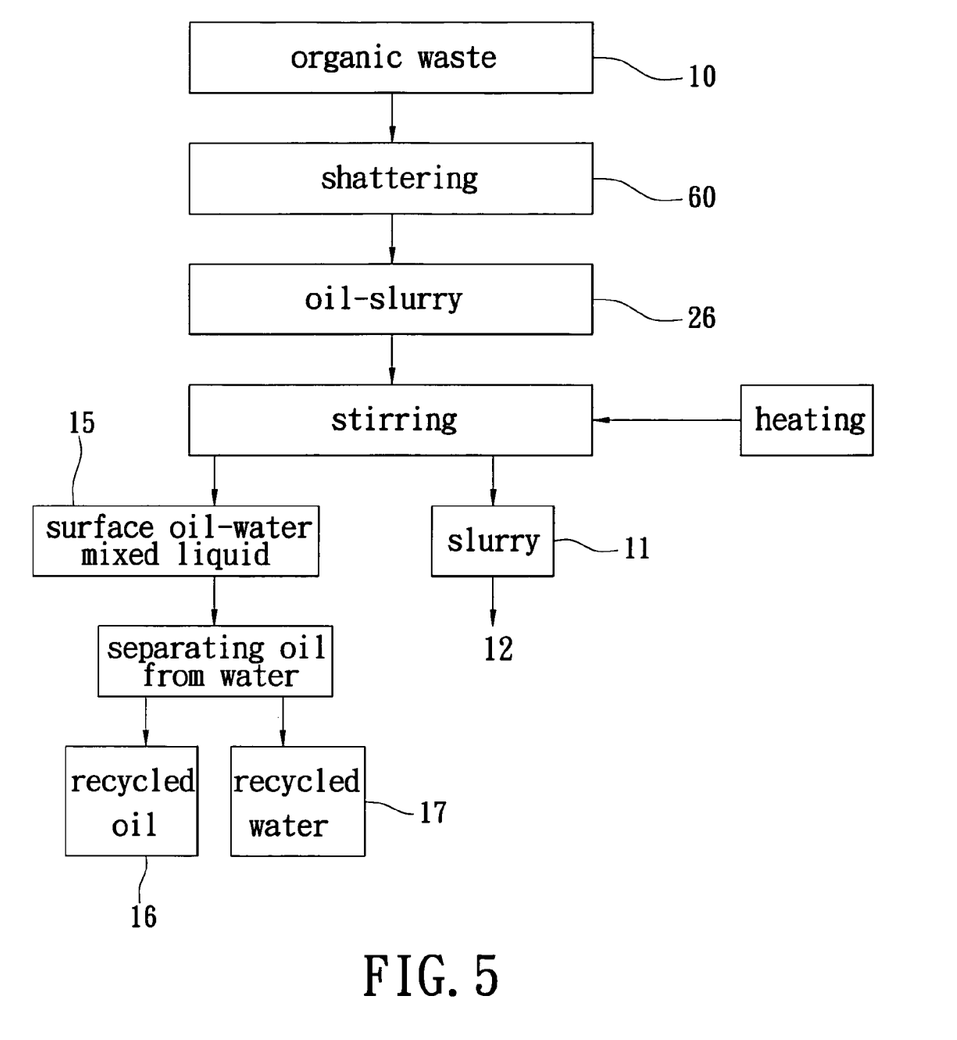
FIG. 5 is a schematic flowchart of pretreatment steps according to the present invention.

Reference is made to FIG. 4 and FIG. 5, which respectively are the schematic diagram of a pretreatment apparatus 30 and a schematic flowchart of pretreatment steps thereof according to the present invention. The pretreatment apparatus 30 includes a storage tank 33, a shattering device 31 and a oil-water separation device 35. The storage tank 33 is located downstream from the shattering device 31, and the oil-water separation device 35 is located downstream from the storage tank 33. The organic waste 10 is guided into the shattering device 31. The shattering device 31 shatters the organic waste 10 to make an oil-slurry 26 that is further guided into the storage tank 33. The heating apparatus 34 carries kerosene or vapor through a check valve, a safety valve and a pressure gauge to the inner wall of the storage tank 33 of the pretreatment apparatus 30 to heat the oil-slurry 26 in the storage tank 33 and to separate the oil-slurry 26 into a slurry 11 and a surface oil-water mixed liquid 15. The surface oil-water mixed liquid 15 is guided into the oil-water separation device 35 to separate the surface oil-water mixed liquid 15 into a recycled oil 16 and a recycled water 17 of the organic waste 10. The oil-water separation device 35 includes an oil collection pipeline 36 for recycling the further of recycled oil 16 and a water collection pipeline 37 for recycling the recycled water 17. The recycled oil 16 can be used to manufacture a cleaning soap. The water collection pipeline 37 connects to an upstream position of the storage tank 33 so that the recycled water 17 can be carried to the storage tank 33 for recycling.

The pretreatment apparatus 30 and pretreatment steps thereof can also include a pretreatment apparatus 30 including a storage tank 33, a shattering device 31 and a oil-water separation device 35. The storage tank 33 is placed upstream from both the shattering device 31 and the oil-water separation device 35. The organic waste 10 is guided into the storage tank 33. The heating apparatus 34 heats the organic waste 10 in the storage tank 33 of the pretreatment apparatus 30 to about 80° C. to separate the organic waste 10 into water, a residue, and a surface oil-water mixed liquid 15. The storage tank 33 has a stirring device 39 to stir the organic waste 10 sufficiently therein, and the heating apparatus 34 helps the organic waste 10 to maintain a uniform working temperature. The water and the residue are further conveyed to the shattering device 31 to be shattered into a slurry 11. A diaphragmatic pump and a spiral conveying device are displaced between the storage tank 33 of the pretreatment apparatus 30 and the shattering device 31. The diaphragmatic pump conveys water to the shattering device 31. The spiral conveying device forces the residue into the shattering device 31. A rough-cut device can be disposed upstream from the storage tank 33 of the pretreatment apparatus 30 to cut organic waste 10 having a large size into small pieces.

Figure 6:
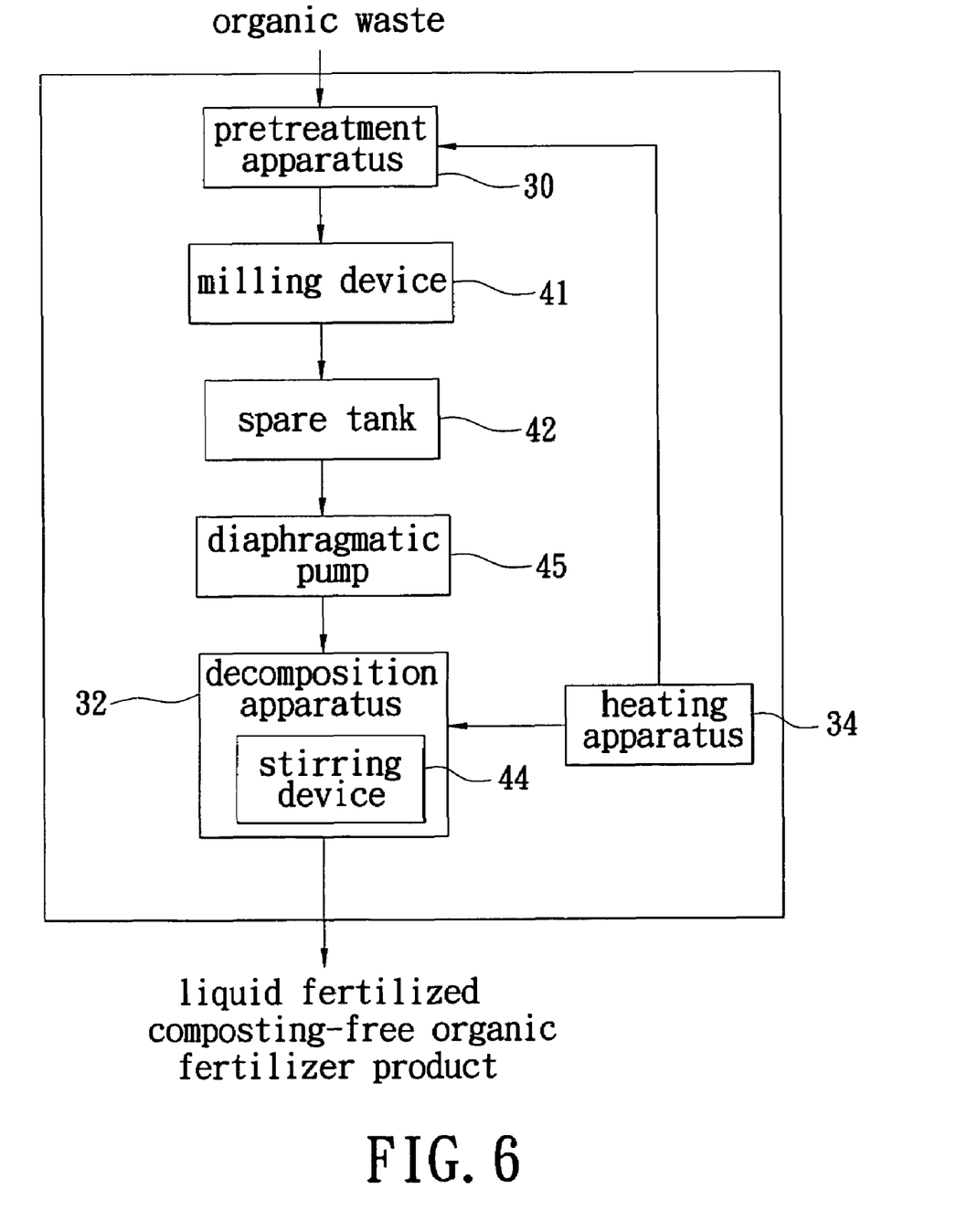
FIG. 6 is a schematic diagram of a system for producing a liquid fertilized composting-free organic fertilizer product according to the present invention.
Figure 7:
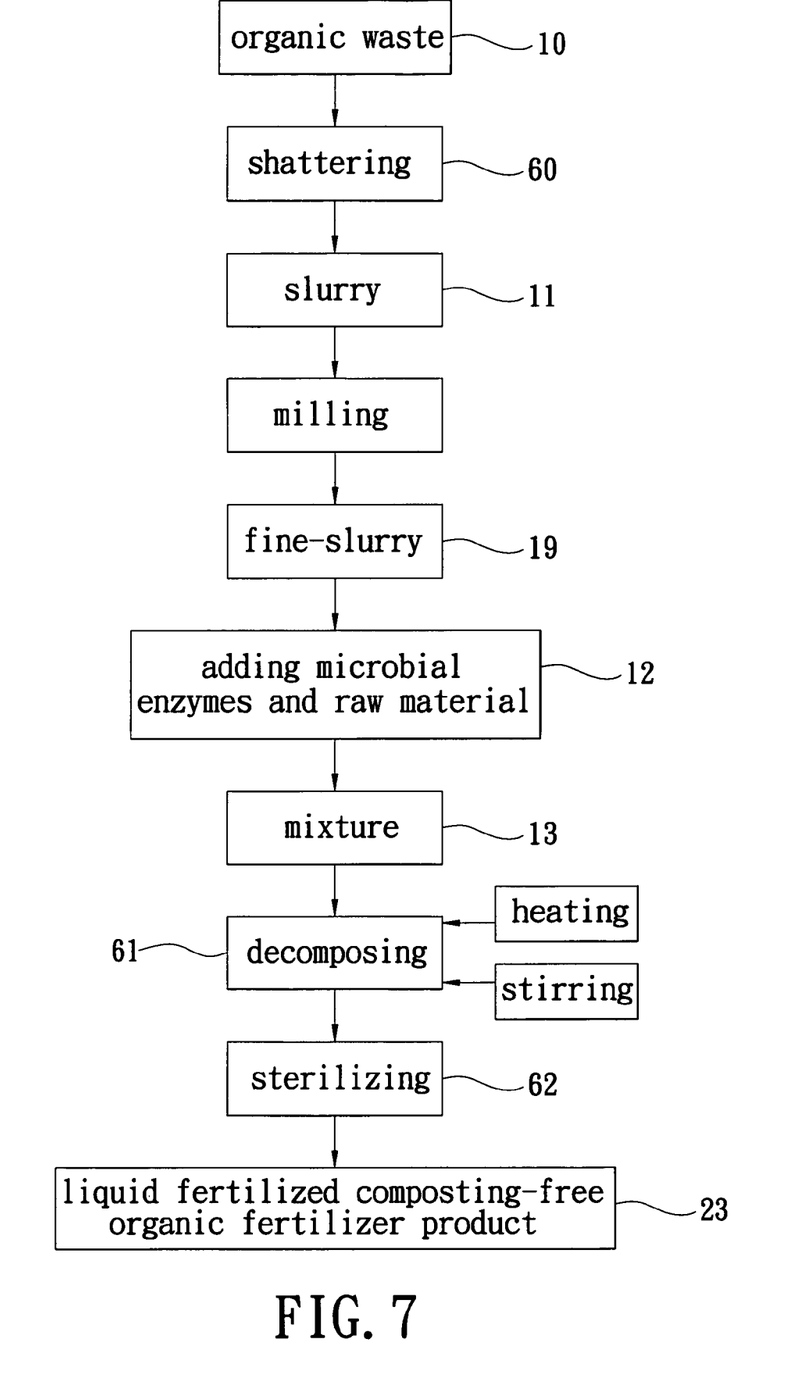
FIG. 7 is a schematic flowchart of a method for producing a liquid fertilized composting-free organic fertilizer product according to the present invention.

Reference made here is to FIG. 6 and FIG. 7, which show how to produce a liquid fertilized composting-free organic fertilizer product 23 according to the present invention. The system further comprises a milling device 41 and an open spare tank 42. The milling device 41 is disposed between the storage tank 33 of the pretreatment apparatus 30 and the decomposition apparatus 32, and the open spare tank 42 is disposed between the milling device 41 and the decomposition apparatus 32. The milling device 41 mills the slurry 11 into a fine-slurry 19 with a size less than 200 meshes per square inch that is further conveyed into the spare tank 42. The microbial enzymes and raw material 12 are added into the spare tank 42 to be mixed with the fine-slurry 19 to become the mixture 13. Raw material, such as carbonized crops or by-gasses, is used to adjust a ratio between carbon and nitrogen of the fine-slurry 19 so as to maintain a suitable pH for the decomposition by the microbial enzymes. By changing the ratio of the composition of the raw material, different type of composting-free organic fertilizer product 25 can be obtained. The spare tank 42 has a diaphragmatic pump 45 to convey the mixture 13 into a decomposition tank of the decomposition apparatus 32. The decomposition apparatus 32 has a feed valve and a regulating valve to avoid a positive pressure developed in the decomposition tank when the diaphragmatic pump 45 operates. The heating apparatus 34 as already explained carries kerosene or vapor through a check valve, a safety valve and a pressure gauge to an inside of a wall of the decomposition apparatus 32 to heat the mixture 13 in the decomposition tank of the decomposition apparatus 32 with a temperature of over 100° C. The decomposition tank has a stirring device 44 to stir the mixture 13 sufficiently at a speed of about 6–15 rpm to help the mixture 13 to reach a uniform working temperature for decomposition. The decomposition tank is an airtight, high-pressure reaction tank. The mixture 13 is decomposed 61, which is then absorbed and purified for poisons, neutralized, and sterilized 62 in the decomposing tank. Thus the mixture 13 is decomposed to become a liquid, composting-free, organic fertilizer product 23. A packer and a sealer are further disposed downstream from the decomposition apparatus 32 in sequence to pack the liquid fertilized composting-free organic fertilizer product 23.

Figure 8:
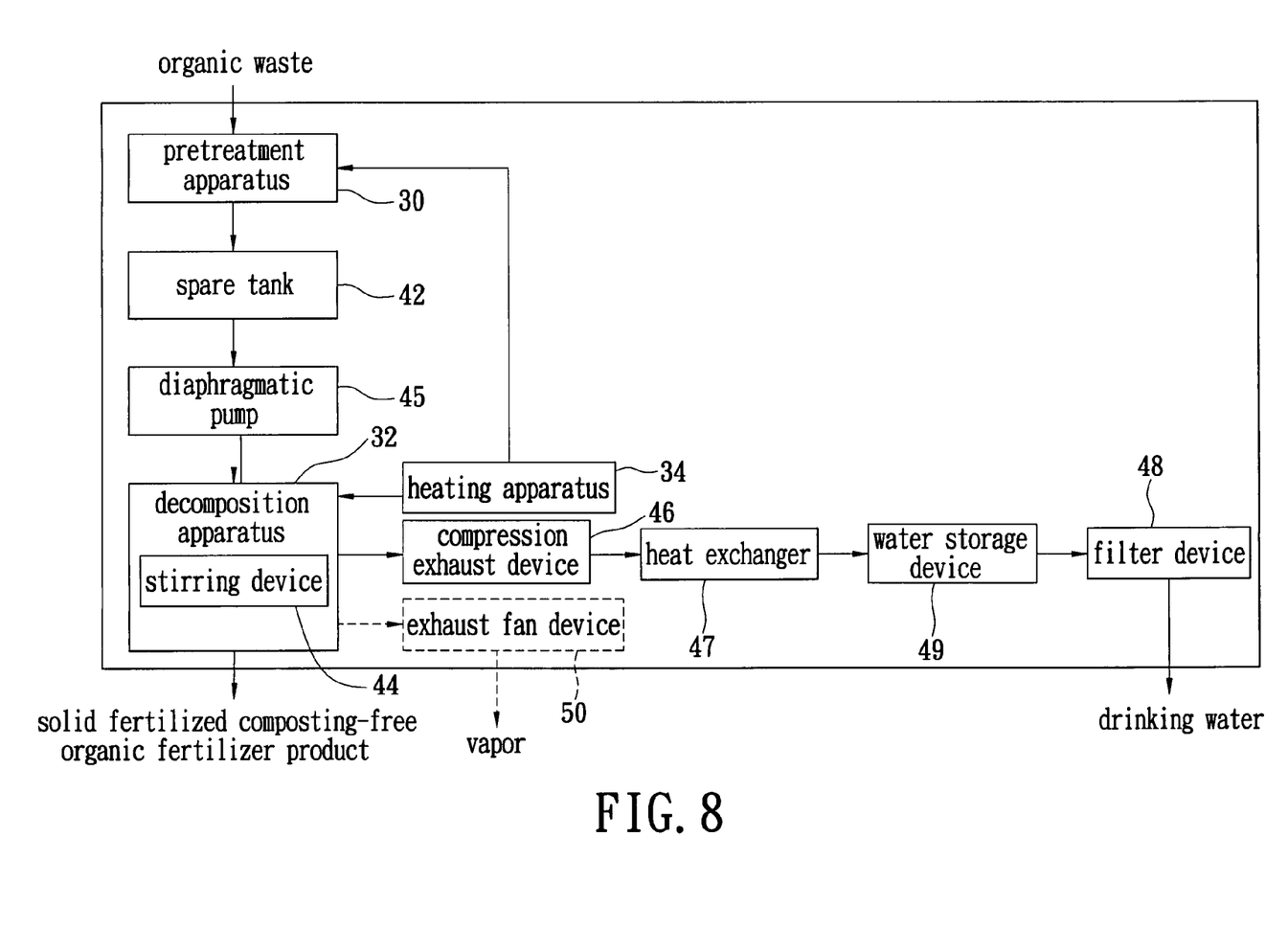
FIG. 8 is a schematic diagram of a system for producing a solid fertilized composting-free organic fertilizer product according to the present invention.
Figure 9:
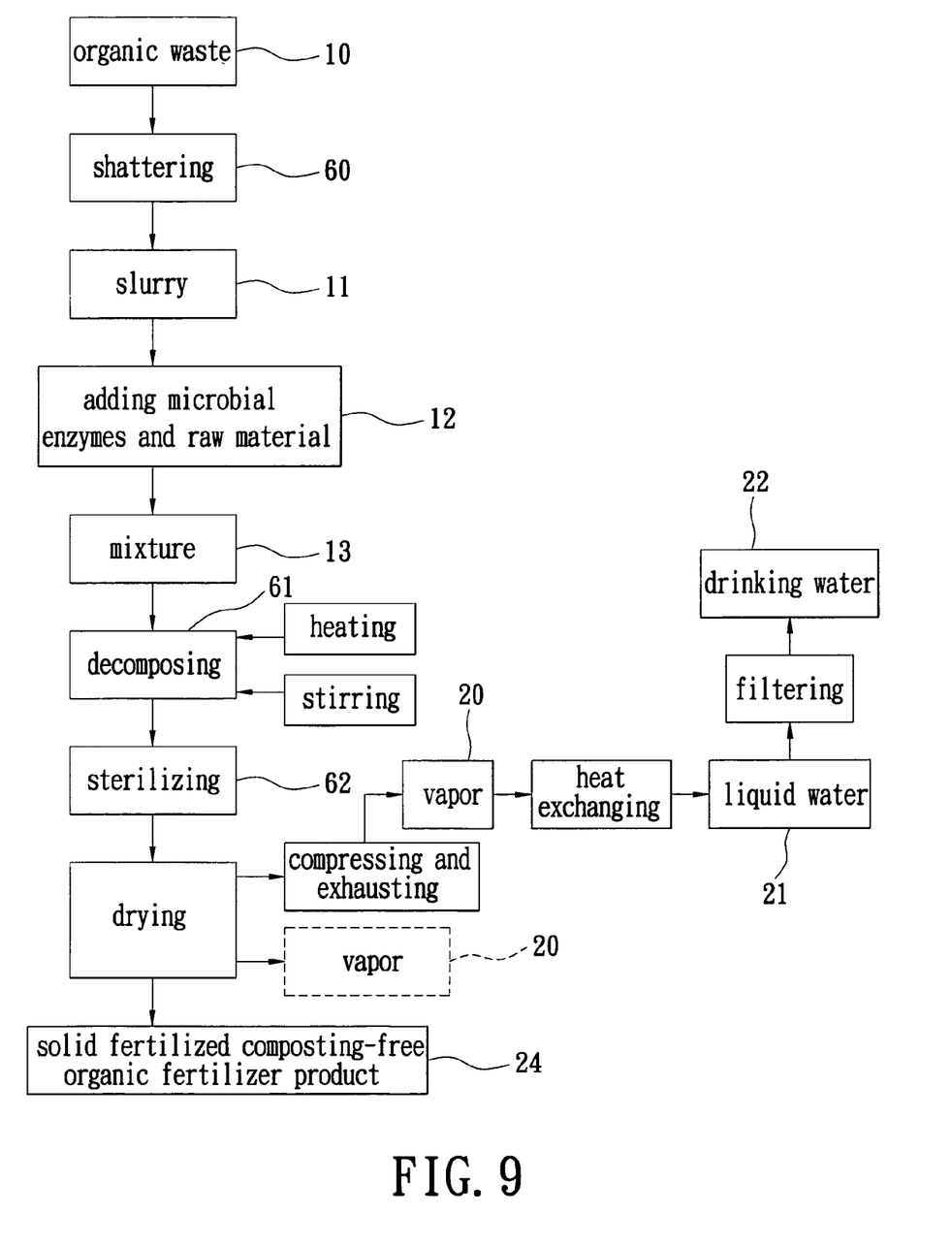
FIG. 9 is a schematic flowchart of a method for producing a solid fertilized composting-free organic fertilizer product according to the present invention.

Reference is made here to FIG. 8 and FIG. 9, which show how to produce a solid fertilized composting-free organic fertilizer product 24 according to the present invention. The system further comprises an open spare tank 42 disposed between the storage tank 33 of the pretreatment apparatus 30 and the decomposition apparatus 32. The storage tank 33 conveys the slurry 11 into the spare tank 42. The microbial enzymes and raw material 12 are added into the spare tank 42 to mix with the slurry 11 and form a mixture 13. Raw material, such as carbonized crops or by-gasses, is used to adjust a ratio between carbon and nitrogen of the slurry 11 so as to maintain a suitable pH for decomposition by the microbial enzymes. By changing the ratio of the composition of the raw material, different type of composting-free organic fertilizer product 25 can be obtained. The spare tank 42 has a diaphragmatic pump 45 to convey the mixture 13 into a decomposition tank of the decomposition apparatus 32. The decomposition apparatus 32 has a feed valve and a regulating valve to avoid a positive pressure generated in the decomposition tank when the diaphragmatic pump 45 operates. The mixture 13 can also be conveyed by a compressing and vacuum self-suction system. In other words, the decomposition apparatus 32 is held in a vacuum condition first, the spare tank 42 is sealed, and then the spare tank 42 is opened to communicate with the decomposition apparatus 32, whereby, the mixture 13 is sucked into the decomposition apparatus 32 automatically. The heating apparatus 34 carries kerosene or vapor through a check valve, a safety valve and a pressure gauge to an inside of a wall of the decomposition apparatus 32 to heat the mixture 13 in the decomposition tank of the decomposition apparatus 32 to a temperature over 100° C., to reach a working temperature. The decomposition tank has a stirring device 44 therein to stir sufficiently the mixture 13 therein at about 6–15 rpm to help the mixture 13 to reach the uniform working temperature for decomposition. The decomposition tank is a vacuum tank. The mixture 13 is decomposed, absorbed, purified for poisons, neutralized, and sterilized 62 in the decomposing tank. The system further includes a compression exhaust device 46, a heat exchanger 47, a water storage device 49, and a filter device 48. The compression exhaust device 46 connects to the decomposition tank of the decomposition apparatus 32. The heating apparatus 34 increases the temperature of the mixture 13 to about 150° C. to accelerate the separation of water in the mixture 13. The compression exhaust device 46 draws out vapor 20 generated from the mixture 13 in a drying process. The heat exchanger 47 connects the compression exhaust device 46 to cool the vapor 20 into liquid water 21, which is further guided into the water storage device 49 connected with the heat exchanger 47. The filtering device 48 is connected to the water storage device 49 to filter the liquid water 21 to make safe drinking water 22. The mixture 13 is therefore decomposed and dried to into a solid, composting-free, organic fertilizer product 24. The decomposition tank can also be a general tank. Thus the system further including an exhaust fan device 50, and the decomposition apparatus 32 does not need the regulating valve. The exhaust fan device 50 connects to the decomposition tank to draw directly out the vapor 20 generated from the mixture 13 in the drying process. The mixture 13 is therefore decomposed and dried to become a solid fertilized composting-free organic fertilizer product 24.

As indicated above, the system for composting-free disposal of organic waste and method for the same of the present invention has the following advantages:

(1) The pretreatment apparatus separates the organic waste into the slurry and the surface oil-water mixed liquid to facilitate the disposal of the organic waste; and the oil-water separation device of the pretreatment apparatus separates the oil from the water to obtain the recycled oil and the recycled water.

(2) The shattering device of the pretreatment apparatus shatters the organic waste into slurry to minimize the organic waste and increase a total surface area for decomposition reactions to complete the work quickly, in 3 to 24 hours.

(3) Microbial enzymes and raw material are added into the slurry to make a mixture, and the mixture is decomposed and sterilized by the decomposition apparatus to form a recycled composting-free organic fertilizer product.

(4) The system conducts decomposition, absorption, poison removal, neutralization and nutrient adjustment simultaneously to increase the efficiency, minimize labor, reduce processing space, recycle oil, water, and residues respectively, and diminish waste water, odors and the propagation of bacteria and diseases.

(5) By the addition of different microbial enzymes and raw material, the organic waste becomes a unique composting-free organic fertilizer product, which can be used as a soil conditioner product, an animal feed, a feed additive, an organic fertilizer, or a bacterial raw material for composting, to recycle a whole resource of the organic waste, to enhance soil quality, improve the physical and chemical properties of the soil, transform a void nutrient into a valid one, and promote growth quality of crops.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed for:

1. A system for composting-free disposal of organic waste, comprising:
   a heating apparatus;
   a pretreatment apparatus, the organic waste being guided into the pretreatment apparatus to become a slurry; and
   a decomposition apparatus disposed downstream from the pretreatment apparatus, microbial enzymes and raw material being added into the slurry to make a mixture, the heating apparatus for heating the mixture, and the decomposition apparatus for decomposing and sterilizing the mixture to make a composting-free organic fertilizer product.

2. The system as claimed in claim 1, wherein the pretreatment apparatus includes a storage tank, a shattering device and an oil-water separation device, the storage tank being disposed downstream from the shattering device, the oil-water separation device being disposed downstream from the storage tank, the organic waste being guided into the shattering device, and the shattering device shattering the organic waste to make an oil-slurry to be further guided into the storage tank, and the heating apparatus heating the oil-slurry in the storage tank to separate the oil-slurry into a slurry and a surface oil-water mixed liquid, the oil-water separation device including an oil collection pipeline and a water collection pipeline, and the water collection pipeline connecting to an upstream position of the storage tank.

3. The system as claimed in claim 2, further comprising a milling device and an open spare tank, the milling device being disposed between the storage tank of the pretreatment apparatus and the decomposition apparatus, the open spare tank being disposed between the milling device and the decomposition apparatus, the milling device milling the slurry into a fine-slurry to be further conveyed into the spare tank, the microbial enzymes and raw material being added into the spare tank to mix with the fine-slurry to form a mixture, the spare tank having a diaphragmatic pump to convey the mixture into a decomposition tank of the decomposition apparatus, the decomposition tank having a stirring device therein, the decomposition apparatus having a feed valve and a regulating valve, the heating apparatus heating the mixture in the decomposing tank, the decomposition tank being an airtight high pressure reaction tank, and the mixture being decomposed to become a liquid fertilized composting-free organic fertilizer product.

4. The system as claimed in claim 2, further comprising an open spare tank disposed between the storage tank of the pretreatment apparatus and the decomposition apparatus, the storage tank conveying the slurry into the spare tank, the microbial enzymes and raw material being added into the spare tank to mix with the slurry to make the mixture, the spare tank having a diaphragmatic pump to convey the mixture into a decomposition tank of the decomposition apparatus, the decomposition tank having a stirring device therein, the decomposition apparatus having a feed valve and a regulating valve, the heating apparatus heating the mixture in the decomposing tank, the decomposition tank being a vacuum tank, the system further including a compression exhaust device, a heat exchanger, a water storage device, and a filter device, the compression exhaust device connecting to the decomposition tank of the decomposition apparatus to draw out vapor generated from the mixture, the heat exchanger connecting to the compression exhaust device in order to cool the vapor into liquid water which is to be further guided into the water storage device connecting with the heat exchanger, the filter device connecting to the water storage device to filter the liquid water to make drinking water, and the mixture being decomposed and dried to become a solid fertilized composting-free organic fertilizer product.

5. The system as claimed in claim 2, further comprising an open spare tank disposed between the storage tank of the pretreatment apparatus and the decomposition apparatus, the storage tank conveying the slurry into the spare tank, the microbial enzymes and raw material being added into the spare tank to mix with the slurry to form the mixture, the spare tank having a diaphragmatic pump to convey the mixture into a decomposition tank of the decomposition apparatus, the decomposition tank having a stirring device therein, the heating apparatus heating the mixture in the decomposing tank, the decomposition tank being a general tank, the system further including an exhaust fan device, the exhaust fan device connecting to the decomposition tank to draw out vapor generated from the mixture, and the mixture being decomposed and dried to become a solid fertilized composting-free organic fertilizer product.

6. The system as claimed in claim 1, wherein the heating apparatus is a circulatory airtight heating system with kerosene therein or a circulatory airtight heating system with vapor therein, and the kerosene or the vapor is heated by a boiler or electricity.

7. The system as claimed in claim 1, further including an electrical circuit control unit, wherein the heating apparatus, the pretreatment apparatus, and the decomposition apparatus electrically connect to the electrical circuit control unit.

* * * * *